US007685659B2

(12) United States Patent
Heimbrock et al.

(10) Patent No.: US 7,685,659 B2
(45) Date of Patent: Mar. 30, 2010

(54) STORABLE FOOT SECTION FOR A BED

(75) Inventors: Richard H. Heimbrock, Cincinnati, OH (US); David W. Hornbach, Brookville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 280 days.

(21) Appl. No.: 11/231,591

(22) Filed: Sep. 21, 2005

(65) Prior Publication Data

US 2006/0070182 A1 Apr. 6, 2006

Related U.S. Application Data

(60) Provisional application No. 60/611,976, filed on Sep. 22, 2004.

(51) Int. Cl.
*A01G 7/06* (2006.01)

(52) U.S. Cl. ........................ 5/602; 5/618; 5/619; 5/624

(58) Field of Classification Search ..................... 5/602, 5/613, 942, 618, 619, 624
See application file for complete search history.

(56) References Cited

U.S. PATENT DOCUMENTS 964,170 A 7/1910 Leonard
2,067,891 A 1/1937 Comper
2,120,732 A 6/1938 Comper
2,177,341 A * 10/1939 Demcak ........................ 5/618
2,257,491 A 9/1941 Armstrong
2,306,031 A 12/1942 Anderson et al.
2,381,633 A 8/1945 Young
2,658,211 A 11/1953 Bendersky
2,754,142 A 7/1956 Baker, Jr.
2,766,463 A 10/1956 Bendersky
2,832,655 A 4/1958 Adolphson
2,872,259 A 2/1959 Thorpe
3,100,129 A 8/1963 Adolphson
3,226,105 A 12/1965 Weickgenannt
3,227,440 A 1/1966 Scott
3,318,596 A 5/1967 Herzog
3,813,091 A 5/1974 Metzger
3,817,512 A 6/1974 Torrey
3,845,945 A 11/1974 Lawley et al.
3,868,103 A 2/1975 Pageot et al.
4,139,917 A * 2/1979 Fenwick ........................ 5/602

(Continued)

FOREIGN PATENT DOCUMENTS

DE 2324486 12/1973

(Continued)

OTHER PUBLICATIONS

In-Service Manual, Affinity II Bed from Hill-Rom, 1996, twenty pages.

*Primary Examiner*—Jennifer H Gay
*Assistant Examiner*—Gilbert Y Lee
(74) *Attorney, Agent, or Firm*—Barnes & Thornburg LLP

(57) ABSTRACT

A patient support is disclosed as including a frame and a foot section having an upper surface, the foot section operatively coupled to the frame and movable between a use position for providing support for a patient and a lowered position for storage. The patient support is also disclosed as having an onboard storage location for the foot section.

19 Claims, 9 Drawing Sheets

U.S. PATENT DOCUMENTS

| | | | | | |
|---|---|---|---|---|---|
| 4,225,126 | A | | 9/1980 | Lee | |
| 4,323,060 | A | | 4/1982 | Pecheux | |
| 4,333,638 | A | | 6/1982 | Gillotti | |
| 4,411,035 | A | | 10/1983 | Fenwick | |
| 4,426,071 | A | | 1/1984 | Klevstad | |
| 4,541,622 | A | * | 9/1985 | Tabuchi | 5/624 |
| 4,552,348 | A | | 11/1985 | Forssmann et al. | |
| 4,564,164 | A | | 1/1986 | Allen et al. | |
| 4,577,730 | A | | 3/1986 | Porter | |
| 4,615,058 | A | | 10/1986 | Feldt | |
| 4,632,349 | A | | 12/1986 | Anstey | |
| 4,682,376 | A | | 7/1987 | Feldt | |
| 4,688,780 | A | | 8/1987 | Hanz | |
| 4,698,837 | A | | 10/1987 | Van Steenburg | |
| 4,724,555 | A | | 2/1988 | Poehner et al. | |
| 4,807,618 | A | | 2/1989 | Auchinleck et al. | |
| 4,886,258 | A | | 12/1989 | Scott | |
| 4,894,876 | A | | 1/1990 | Fenwick | |
| 4,898,491 | A | | 2/1990 | Van Steenburg | |
| 4,940,218 | A | | 7/1990 | Akcelrod | |
| 4,993,762 | A | | 2/1991 | Rogers et al. | |
| 5,039,167 | A | | 8/1991 | Sweet | |
| 5,104,363 | A | | 4/1992 | Shi | |
| 5,116,008 | A | | 5/1992 | Allen | |
| 5,129,117 | A | | 7/1992 | Celestina et al. | |
| 5,134,737 | A | | 8/1992 | Wyman | |
| 5,148,562 | A | | 9/1992 | Borders et al. | |
| 5,157,800 | A | | 10/1992 | Borders | |
| 5,201,087 | A | | 4/1993 | Wickham et al. | |
| 5,214,812 | A | | 6/1993 | Bartow et al. | |
| 5,226,187 | A | | 7/1993 | Borders et al. | |
| 5,362,302 | A | | 11/1994 | Jensen et al. | |
| 5,369,825 | A | * | 12/1994 | Reesby | 5/613 |
| 5,472,412 | A | | 12/1995 | Knoth | |
| 5,481,770 | A | | 1/1996 | Ahlsten | |
| 5,555,582 | A | * | 9/1996 | Jerideau | 5/600 |
| 5,560,577 | A | | 10/1996 | Keselman | |
| 5,636,899 | A | | 6/1997 | Schiff et al. | |
| 5,645,079 | A | | 7/1997 | Zahiri et al. | |
| 5,661,859 | A | | 9/1997 | Schaefer | |
| 5,740,572 | A | | 4/1998 | Hannant | |
| 5,774,914 | A | | 7/1998 | Johnson et al. | |
| 5,802,641 | A | | 9/1998 | Van Steenburg | |
| 5,862,549 | A | | 1/1999 | Morton et al. | |
| 5,926,878 | A | | 7/1999 | Morton et al. | |
| 5,941,175 | A | | 8/1999 | Bannister | |
| 5,961,085 | A | | 10/1999 | Navarro et al. | |
| 6,058,534 | A | | 5/2000 | Navarro et al. | |
| 6,089,593 | A | * | 7/2000 | Hanson et al. | 280/650 |
| 6,202,230 | B1 | * | 3/2001 | Borders | 5/618 |
| 6,408,464 | B1 | | 6/2002 | Weismiller et al. | |
| 6,470,520 | B1 | | 10/2002 | Weismiller et al. | |
| 6,754,923 | B2 | * | 6/2004 | Borders et al. | 5/624 |
| 7,127,756 | B2 | * | 10/2006 | Brophy et al. | 5/602 |
| 2004/0133979 | A1 | * | 7/2004 | Newkirk et al. | 5/600 |

FOREIGN PATENT DOCUMENTS

| | | |
|---|---|---|
| FR | 1518724 | 12/1966 |
| FR | 2666013 | 2/1992 |
| GB | 2225228 | 5/1990 |
| JP | 56-109663 | 8/1981 |
| JP | 60-195018 | 10/1985 |
| JP | 61-119257 | 6/1986 |
| JP | 61-168351 | 7/1986 |
| JP | 2-147120 | 6/1990 |
| JP | 2-297366 | 12/1990 |
| JP | 2-297367 | 12/1990 |
| JP | 2-297368 | 12/1990 |
| JP | 3-4808 | 1/1991 |
| JP | 3-4809 | 1/1991 |
| JP | 5-31145 | 2/1993 |
| JP | 60-85749 | 3/1994 |
| JP | 6-12755 | 4/1994 |
| JP | 61-22577 | 5/1994 |
| JP | 61-44019 | 5/1994 |
| JP | 61-50626 | 5/1994 |
| JP | 7-112012 | 5/1995 |

* cited by examiner

STORABLE FOOT SECTION FOR A BED

CROSS-REFERENCE TO RELATED APPLICATION

This application claims the benefit of U.S. Provisional patent Application Ser. No. 60/611,976, filed Sep. 22, 2004, titled STORABLE FOOT SECTION FOR A BED, the disclosure of which is expressly incorporated herein by reference.

FIELD OF THE INVENTION

The present invention relates generally to patient supports. More specifically, the present invention relates maternity beds having an onboard storage location for a foot section.

BACKGROUND AND SUMMARY OF THE INVENTION

Conventional birthing beds often have a detachable foot section. The removal of the foot section permits a caregiver to slide a footstool into the space vacated by the foot section so as to be in position to assist in delivery. The removed foot section must be placed somewhere for storage during the delivery. After delivery, the foot section is reattached to a patient support deck (hereafter, "the patient support") of the birthing bed. The present invention comprises improvements to such beds.

The present invention will be described primarily as a birthing or delivery bed, but it will be understood that the same may be used in conjunction with any other patient support apparatus, such as a hospital stretcher, an examination table, or an operating table. Also, the present invention will be described primarily as a mechanism for attaching a foot section to the patient support such that the foot section extends generally horizontally in the plane of the patient support. But it will be understood that the same may be used for attaching a head section or a side panel to the patient support such that the head section or the side panel, as the case may be, extends generally horizontally in the plane of the patient support.

In accordance with one embodiment of the present invention, there is provided a patient support including a frame and a foot section having an upper surface. The foot section is coupled to the frame and movable from a raised position for providing support for a patient to a lowered position for storage.

Pursuant to another aspect of the present invention, there is provided a patient support to support a patient including a frame and a deck. The deck includes a plurality of sections, at least one of the plurality of sections coupled to the frame and one of the sections being a foot section. The foot section defines a first position having a first generally horizontal plane with the another section and a second position spaced from the first generally horizontal plane.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
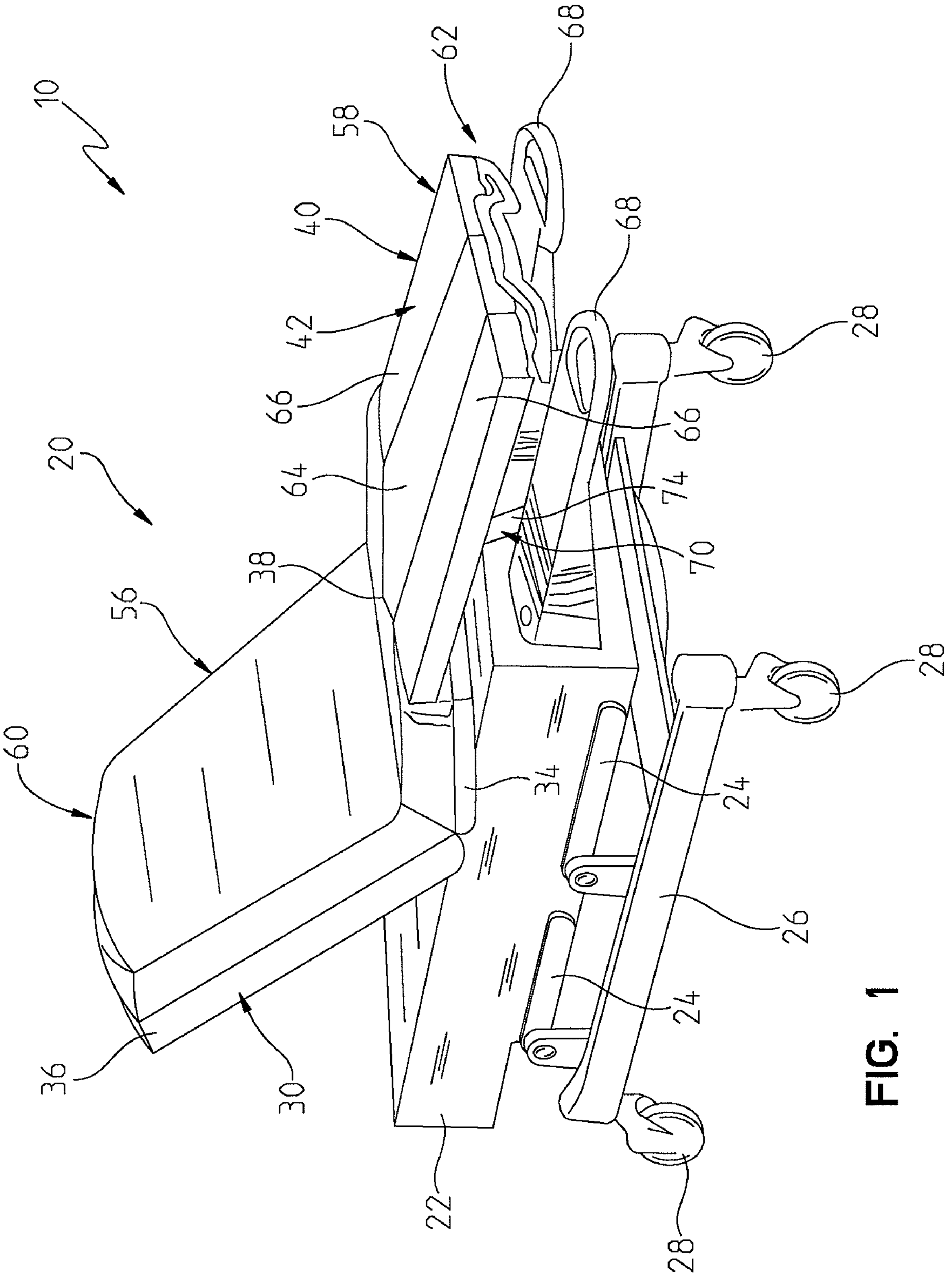
FIG. 1 is a perspective view of a first embodiment of a patient support having a raised foot section.
Figure 2:
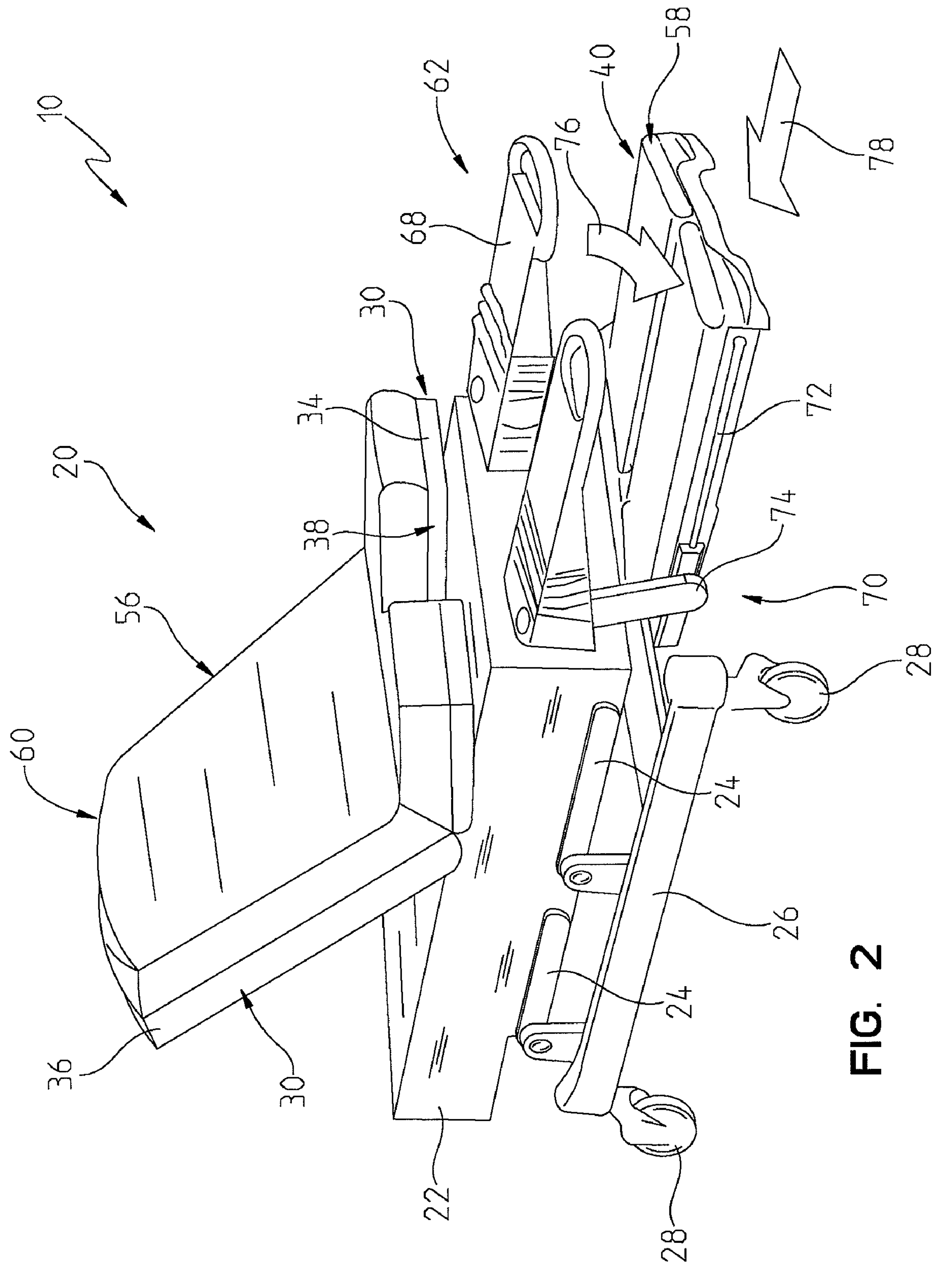
FIG. 2 is a perspective view of the patient support of FIG. 1 with the foot section in a lowered position.
Figure 3:
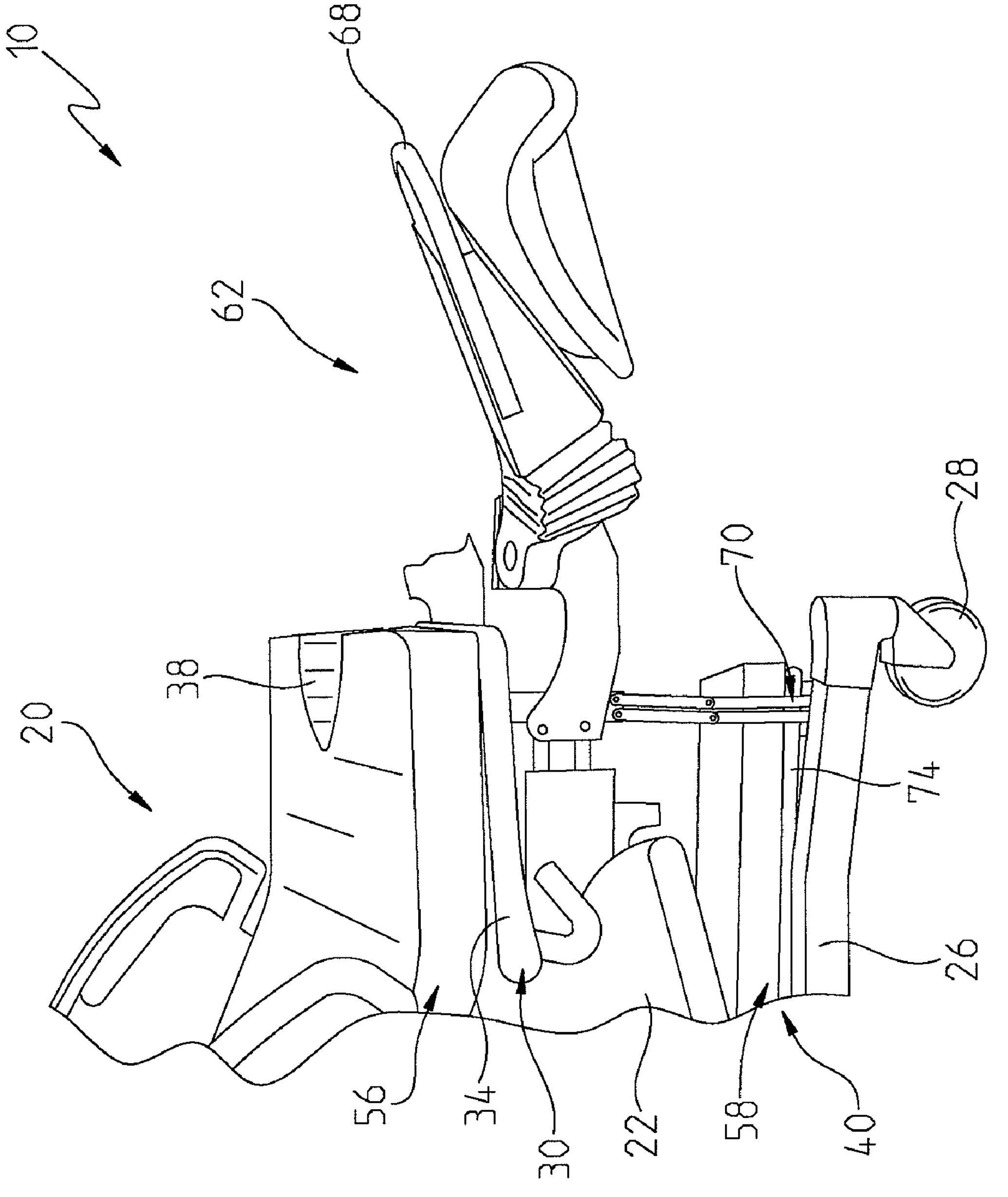
FIG. 3 is a perspective view of the patient support of FIG. 1 with the foot section in a stowed position.

Referring to the drawings, FIGS. 1-3 show a first embodiment birthing bed 20 in a conventional hospital room 10. Bed 20 has a main or intermediate frame 22 mounted by a parallelogram linkage 24 to a base frame 26. Base frame 26 has casters 28 for supporting bed 20 on the floor. With the exception of foot section 40, bed 20 may be similar to the bed described in U.S. patent application Ser. No. 60/325,690, filed Sep. 28, 2001, and U.S. Pat. No. 6,757,924 which are assigned to the assignee of the present invention and are expressly incorporated herein by reference. Bed 20 includes a patient support deck 30 for supporting a mattress 56 on which a patient can rest. Patient support deck 30 includes a generally horizontal seat section 34 coupled to main frame 22. A head section 36 is pivotally coupled to seat section 34 so that bed 20 can be articulated between a generally horizontal lying-down position defining a generally horizontal, upwardly-facing surface in the plane of seat section 34, a generally reclining sitting-up position with head section 36 inclined with respect to seat section 34, and a number of intermediate positions therebetween. While not shown in all figures, beds 20 typically include siderails 44 and/or grip handles 46.

Seat section 34 includes a central opening 38 into which a removable foot section 40 is inserted to provide a full support when foot section 40 is latched into place with seat section 34. A detachable portion 58 of mattress 56 is secured to foot section 40 by any suitable means—such as a plurality of hook and loop (i.e. Velcro) fasteners, snaps, ties or the like. Upper surface 42 of foot section 40 is illustratively configured to be aligned in substantially the same plane as seat section 34 of patient support 30 only when foot section 40 is fully inserted and latched as shown in FIG. 1. Detachable portion 58 includes an inner section 64 pivotably coupled to two outer sections 66.

Foot section 40 includes a handle (not shown) adjacent to a foot end of foot section 40. The handles assist the caregiver to pull the foot section 40 away from seat section 34 so that foot section 40 is able to be stored. Additionally, the handle releases a lock/latch (not pictured) that holds foot section 40 in the raised position. When released from the raised position, storage of conventional foot sections has been typically somewhere within room 10. The present disclosure describes embodiments where foot section 40 does not totally separate from bed 20 and allows storage of foot section 40 onboard bed 20. As used in this description with reference to bed 20, the phrase "head end" will be used to denote the end of any referred-to object that is positioned to lie nearest head end 60 of bed 20, and the phrase "foot end" will be used to denote the end of any referred-to object that is positioned to lie nearest foot end 62 of bed 20.

No matter the position of foot section 40, foot section 40 is coupled to main frame 22 via linkage 70. Linkage 70 includes slide housings 72 coupled to each lateral side of foot section 40 and extension slides 74 slidably and rotatably coupled to slide housings 72 and rotatably coupled to main frame 22. Extension slides 74 rotatably and slidingly couple to slide housings 72 via rollers (not pictured) that may travel within slide housings 72. Linkage 70 additionally includes at least one conventional gas spring (not pictured) to assist in controlling movement of the foot section 40.

To stow foot section 40, outer sections 66 of detachable portion 58 are folded inward on top of inner section 64. Upon activation of the foot section handles, foot section 40 is partially uncoupled from main frame 22. Foot section 40 then may move in the direction of foot end 62 as slide housings 72 attached to foot section 40 slide relative to extension slides 74. This movement of foot section 40 and the folding in of the outer sections 66 allows foot section 40 to gain clearance relative to leg supports 68. Foot section 40 then rotates downward in the direction of arrow 76 as extension slides 74 rotate relative to slide housings 72 and main frame 22. The rotation of extension slides 74 relative to slide housings 72 is proportional to the rotation of extension slides 74 relative to main frame 22. Thus, foot section 40 is maintained in a generally horizontal position as it travels. Furthermore, the gas spring provides upward force that allows foot section 40 to slowly lower from the raised position to the lowered position. Once in the lowered position as shown in FIG. 2, the caregiver then applies force in the direction of arrow 78 to cause slide housings 72 to slide relative to extension slides 74. After movement, foot section 40 is in the stowed position shown in FIG. 3. To bring foot section 40 out of storage, the above-described method is simply reversed. More particularly, a caregiver pulls foot section 40 toward foot end 62, raises foot section 40 with the aid of the gas spring, pushes foot section 40 back toward head end 60 until it latches to main frame 22, and then unfolds outer sections 66 of detachable portion 58 to cover leg supports 68. Accordingly, onboard storage for foot section 40 is provided.

In order to stow foot section 40 beneath main frame 22 as shown in FIG. 3, sufficient clearance is provided between main frame 22 and base frame 26. In one embodiment, main frame 22 is prevented from traveling below a certain height so as to preserve the necessary vertical spacing. In another embodiment, main frame 22 is allowed to travel downward to intrude into the space where a stowed foot section 40 is positioned. However, in such an embodiment, main frame 22 automatically raises to re-establish the necessary spacing when foot section handles are activated and foot section 40 disengages from main frame 22. Sensors (not pictured) within latches (not pictured), complimentary to the handles, detect the presence or coupling of foot section 40 within the latches when the foot section 40 is in the raised position. Failure to detect foot section 40 within the latches informs an onboard controller (not pictured) that activates the parallelogram linkage 24 to raise main frame 22, if necessary. If main frame 22 is already in a sufficiently high position, then no action is taken. Furthermore, the onboard controller prevents main frame 22 from lowering into the stowage space while foot section 40 is not detected by the sensors within the latches.

Figure 4:
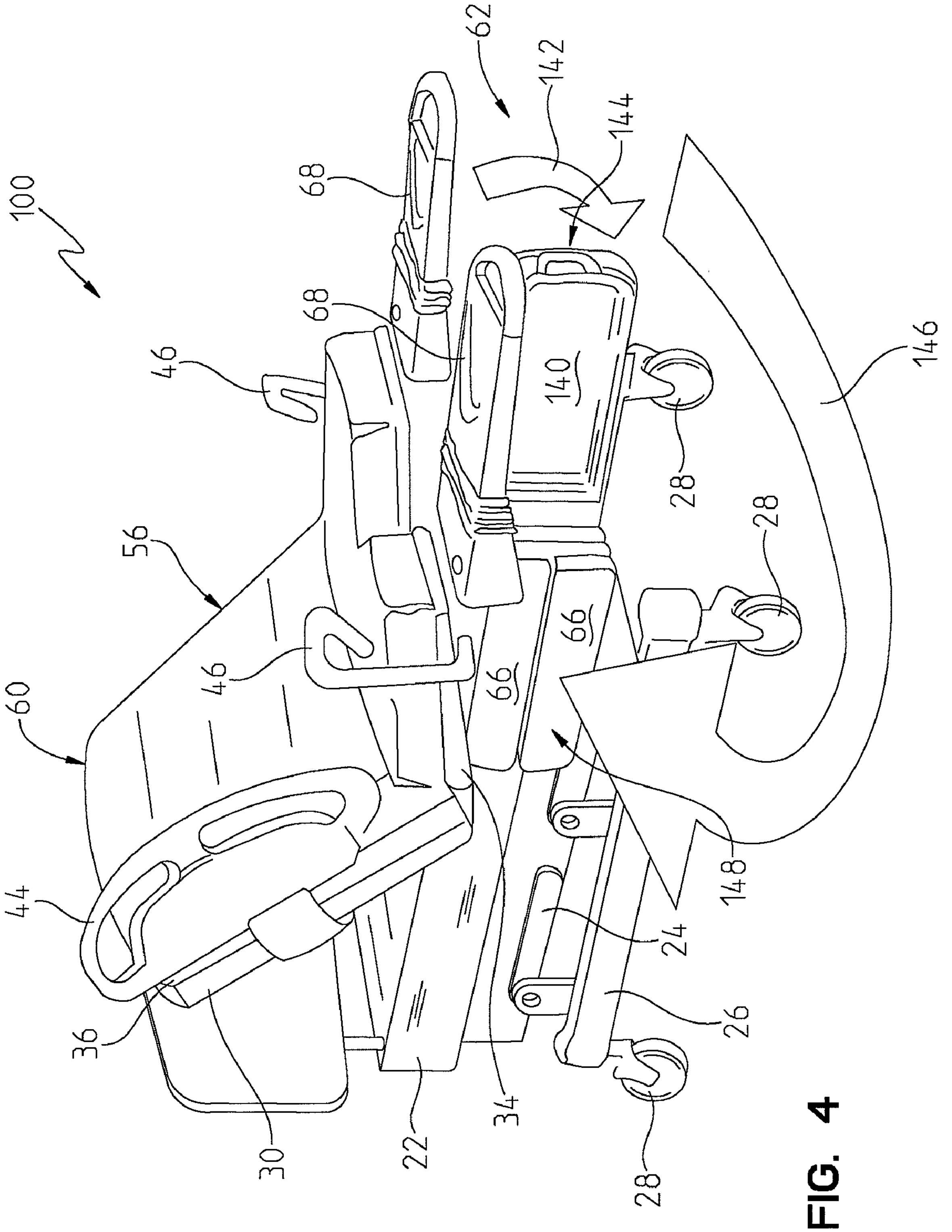
FIG. 4 is a perspective view of a second embodiment of a patient support showing a foot section in a lowered position and in a stowed position.

Another embodiment of a foot section 140 is shown in FIG. 4. Bed 100 is similar to bed 20 and looks similar to bed 20 when respective foot sections 40, 140 are each in raised positions. To lower foot section 140 to a stowed position, outer sections 66 of detachable portion 58 are first folded in onto inner section 68. Latches, straps, hook and loop fasteners, or any other suitable attachment device (not pictured) may be used to secure outer section 66 to inner section 68 in the folded configuration. Activation of a lever or handle (not pictured) allows foot section 140 to rotate about its longitudinal axis and pivot downward as shown by arrow 142 to the position marked 144. Sensors (not pictured) again detect the presence of foot section 140 in the raised position. As previously discussed, failure to detect foot section 140 within the latches informs an onboard controller (not pictured) that activates the parallelogram linkage 24 to raise main frame 22, if necessary. If main frame 22 is already in a sufficiently high position, then no action is taken. Furthermore, the onboard controller prevents main frame 22 from lowering into the stowage space while foot section 140 is not detected by the sensors within the latches. Additionally, one leg support 68 (right leg support as shown) is either manually or automatically raised to provide clearance for foot section 140. Once such clearance is achieved, foot section 140 is swung horizontally about a vertical axis in the direction shown by arrow 146. This movement places foot section 140 in a stowed position indicated by reference number 148. Once foot section 140 is stowed, right leg support 68 may be lowered if desired. Alternatively, sensors are provided to determine when foot section 140 is in the stowed position and right leg support 68 is automatically lowered upon detection of foot section 140 in the stowed position.

To raise foot section 140 from stowed position 148 to the raised position, right leg support 68 must be manually or automatically positioned to allow clearance of foot section 140. Foot section 140 is then rotated toward foot end 62 until reaching position 144. Foot section 140 is then rotated upwards and then rotated about its longitudinal axis. Outer sections 66 are then folded outwardly.

Figures 5A, 5B, 5C:
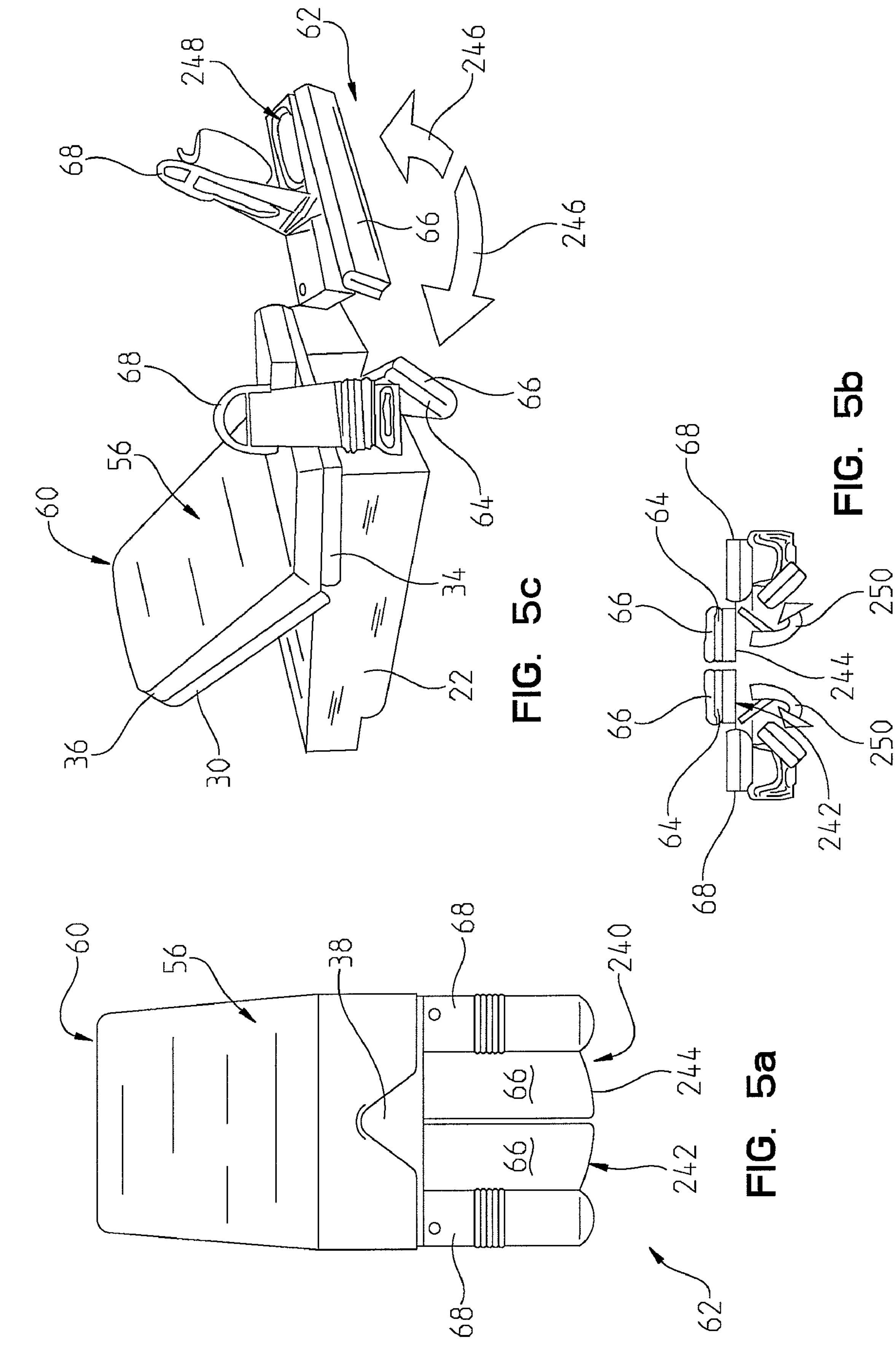
FIGS. 5*a-c* are top, end elevational, and perspective views of a third embodiment foot section.

A third embodiment of a foot section 240 is shown in FIGS. 5*a-c*. FIG. 5*a* shows foot section 240 in a raised position with outer sections 66 folded in to expose leg supports 68. Outer sections 66 preferably include a fastener to hold outer sections 66 in the folded in configuration. Foot section 240 includes two sections 242, 244, each hingedly coupled to a respective leg support 68. Each section 242, 244 has a release handle (not pictured) associated therewith that control respective latches. Latches hold the position of sections 242, 244 relative to leg supports 68. Activation of one of the handles allows the respective section 242, 244 to rotate downward in the direction of arrows 250. Sections 242, 244 rotate greater than 90° downward to be mostly beneath the respective leg support 68. The latches again hold sections 242, 244 in the lowered position until released by the handles. Once in the lowered position, leg supports 68 selectively hinge outwardly in the directions of arrows 246. The stowed position shown in FIG. 5*c*, like each of the previously discussed stowed positions, allows caregiver access to the perineum of a patient. An instrument tray 248 may be attached to the bottom of one or both sections 242, 244 such that tray 248 is usable when sections 242, 244 are in the stowed positions.

Sections 242, 244 of foot section 240 are moved from the stowed position to the raised position by first rotating leg supports 68 inward relative to main frame 22. Activation of the handles allow sections 242, 244 to then rotate upward relative to leg supports 68. Outer sections 66 are then unfastened and folded outward to cover leg supports 68.

Figure 6:
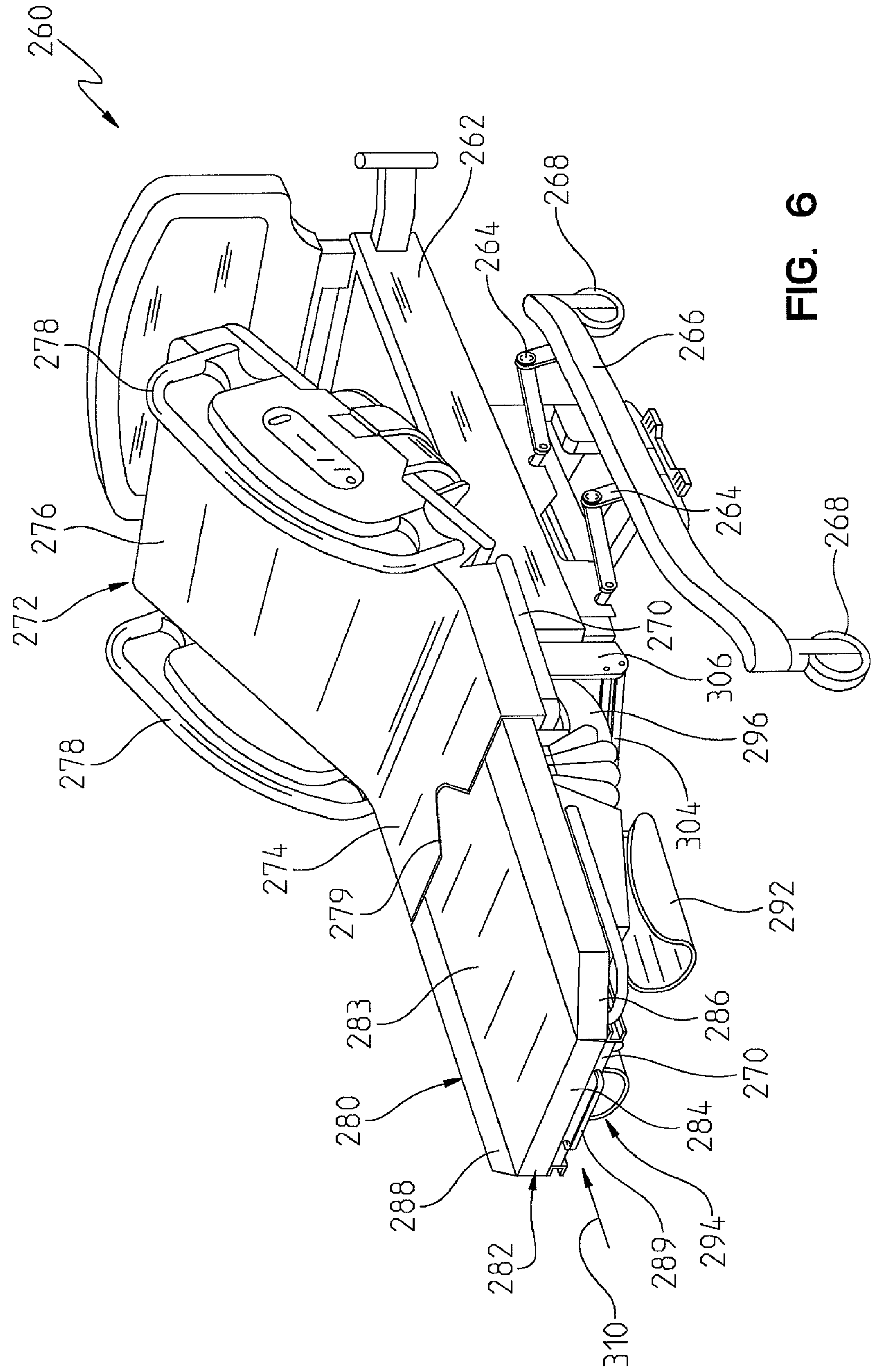
FIG. 6 is a perspective view of a patient support including a foot section in a raised position and coupled to the seat section.

FIG. 6 illustrates a perspective view of another embodiment of a birthing bed 260 used in a conventional hospital room. Bed 260 has a main or intermediate frame 262 mounted by a parallelogram linkage 264 to a base frame 266. Base frame 266 includes castors 268 for supporting the bed 260 on the floor. Bed 260 includes a patient support deck 270 for supporting a mattress 272 on which a patient can sit, lie, or recline. Patient support deck 270 includes a generally horizontal seat section 274 coupled to mainframe 262. A head section 276 is pivotably coupled to seat section 274 so that the bed 260 can be articulated between a generally horizontal laying position defining a generally horizontal upwardly facing surface in the plane of the seat section 274. In addition, the bed 260 provides a generally reclining sitting up position with the head section 276 inclined with respect to the seat section 274. A number of intermediate positions therebetween are also possible. In addition, the bed can include a plurality of siderails 278 coupled to the deck 270.

Seat section 274 can include a central opening 279 into which a removable foot section 280 can be inserted to provide full support when foot section 280 is coupled or latched into place with seat section 274. A detachable portion 282 of the mattress 272 is secured to foot section 280 as previously described. An upper surface 283 of foot section 280 is configured to be aligned in substantially the same plane as seat section 274 of the mattress 272. Detachable portion 282 includes an inner section 284 coupled to an outer section 286 and another outer section 288 both of which are pivotably coupled to the inner section 284.

The foot section 280 includes a handle 289 which is coupled to the support deck 270 which is disposed beneath the detachable portion 282. The handle 289 includes a latching mechanism (not shown) that enables a caregiver to latch the foot section 280 into the attached position to the seat section 274 as well as to unlatch the foot section 280 therefrom.

As previously described, no matter the position of the foot section 280, foot section 280 is coupled to the mainframe 262 or to the seat section 274.

When the foot section 280 is coupled to the seat section 274 and the upper surfaces of the foot section and seat section are essentially planar, the outer section 286 and outer section 288 can be extended from the inner section 284 and positioned upon a first leg support 292 and a second leg support 294. Each of the leg supports 292 and 294 are coupled to a respective yoke, yoke 296 being the only one which is illustrated. For a more detailed description of the leg supports used in the present embodiment, please refer to U.S. Pat. No. 6,654,974, the disclosure of which is expressly incorporated herein in its entirety by reference.

Figure 7:
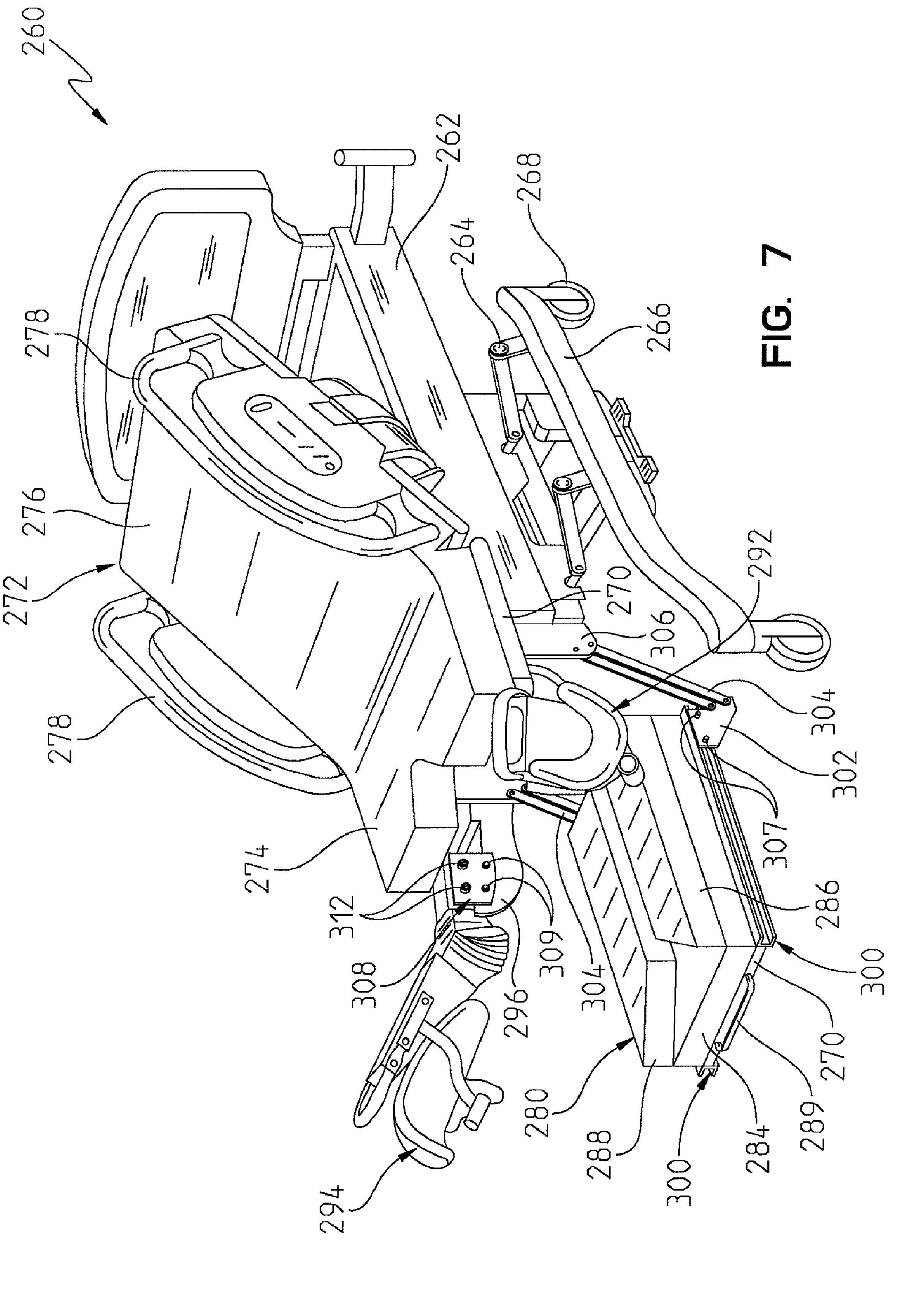
FIG. 7 is a perspective view of a patient support including the foot section in a lowered position.
Figure 8:
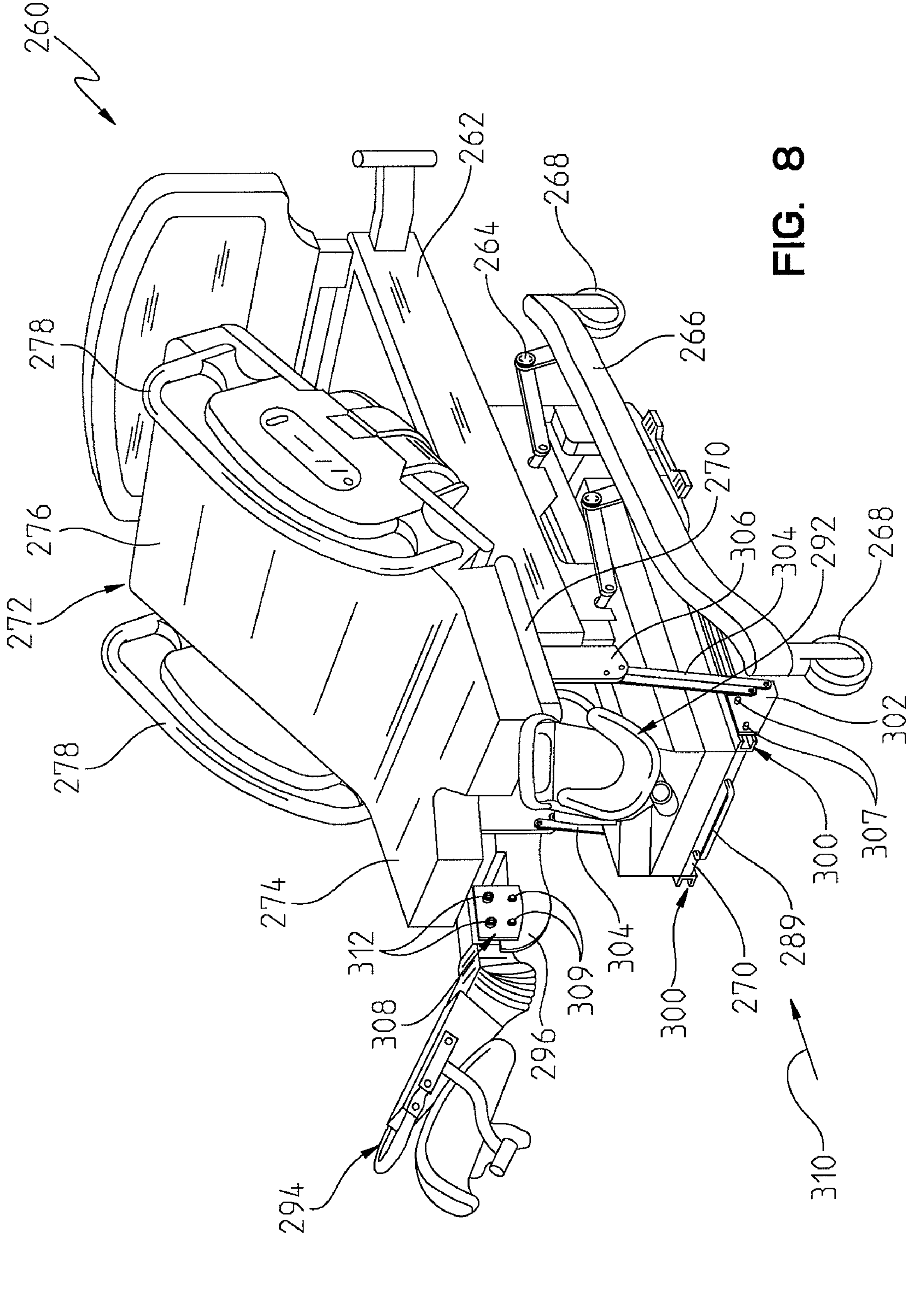
FIG. 8 is a perspective view of a patient support including the foot section in a stowed position.
Figure 9:
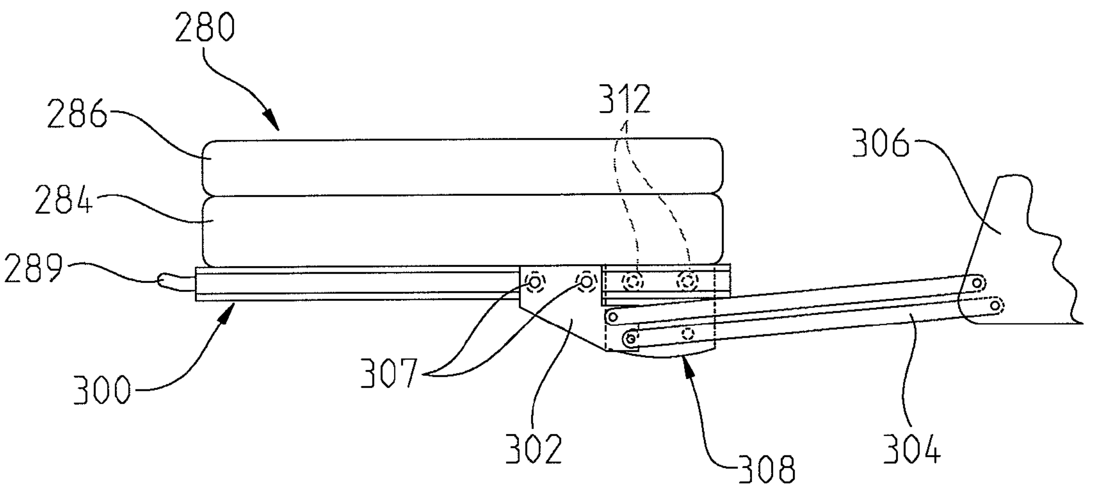
FIGS. 9-11 are side views of the seat section in a coupled position, a decoupled position, and a stowed position.

FIGS. 7 through 11 illustrate the foot section 280 in a variety of positions including an attached position, a detached position, and a stowed position. In FIG. 9, the extension slide mechanism can be seen when the when the foot section 280 is in the attached position. In FIG. 9, the seat section 274 is not illustrated. An extension slide includes a foot section channel bracket 300, which is coupled to the foot section 180, engages a foot section bracket 302. The foot section bracket 302 is in turn coupled to the bed through a linkage 304 and a seat bracket 306, coupled to the seat section 274. While the side view of FIG. 9 illustrates a single channel 300, the opposite side of the deck 270 also includes a channel bracket 30. In addition, corresponding brackets 302, linkage 304, and bracket 306 are included on the opposite side as well. (see FIG. 7)

The foot section bracket 302 moves along the channel bracket 300 on a plurality of roller wheels 307. When the foot section 280 is in the attached and raised position, the channel bracket 300 engages a yoke bracket 308 which is attached to the yoke 296. The yoke bracket 308 is coupled to the yoke by a plurality of connectors 309. When the foot section 280 engages with the seat section 274, the channel bracket 300 engages a plurality of roller wheels 312, also coupled to the yoke bracket which rotate and move within the channel bracket 300.

Figure 10:
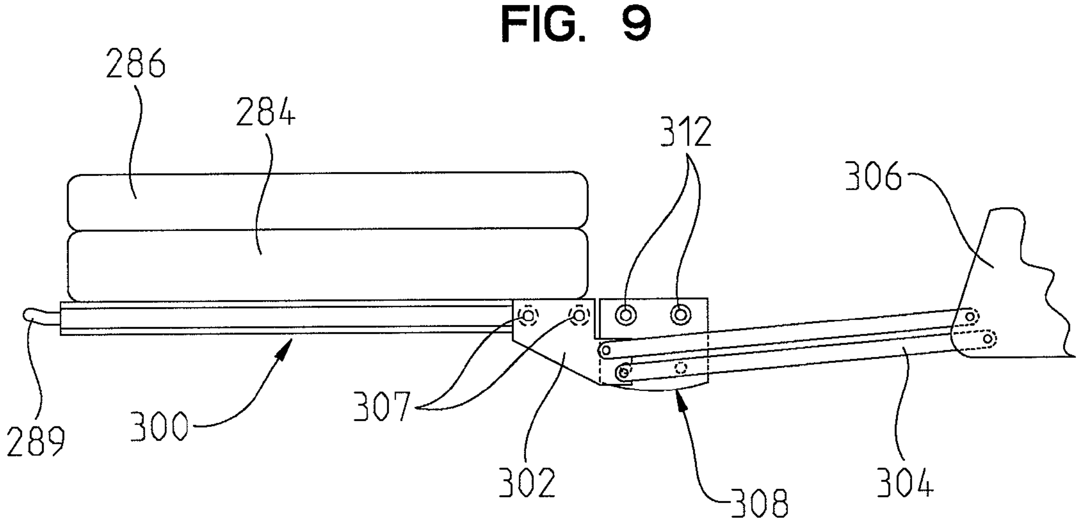

To disengage the foot section 280 from the seat section 274, the latching mechanism at the handle 289 is activated to release the foot section 280 from the seat section. Once unlatched, a caregiver pulls the handle 289 in a horizontal direction such that the roller wheels 312 move along the channel bracket 300 to a point where the roller wheels 312 disengage from the channel bracket 300 as illustrated in FIG. 10. As previously described, the seat section includes a mechanism to provide for a controlled lowering of the seat section into the stowed position, for instance with the use of a pneumatic cylinder, to prevent the seat section from falling towards the floor in an uncontrolled fashion. As the seat section begins to lower, as illustrated in FIG. 7, the leg supports 292 and 294 rotate outwardly away from their previous locations such that a space is formed between the two foot sections to enable the lowering of the foot section 280. The seat section 280 continues to lower until it reaches a bottom position which is determined by the limits of the linkage 304, which can include a four bar linkage as is understood by those skilled in the art. Releasing the foot section 280 from the seat section 274 can automatically raise the bed to a position where the foot section 280 can be placed in the stowed position if the bed is not high enough. For instance, sensor (not shown), including a mechanical switch or electronic sensor, can be used to determine bed height. If the bed height is too low, as determined by the sensor, the bed is raised to enable storage of the foot section.

Figure 11:
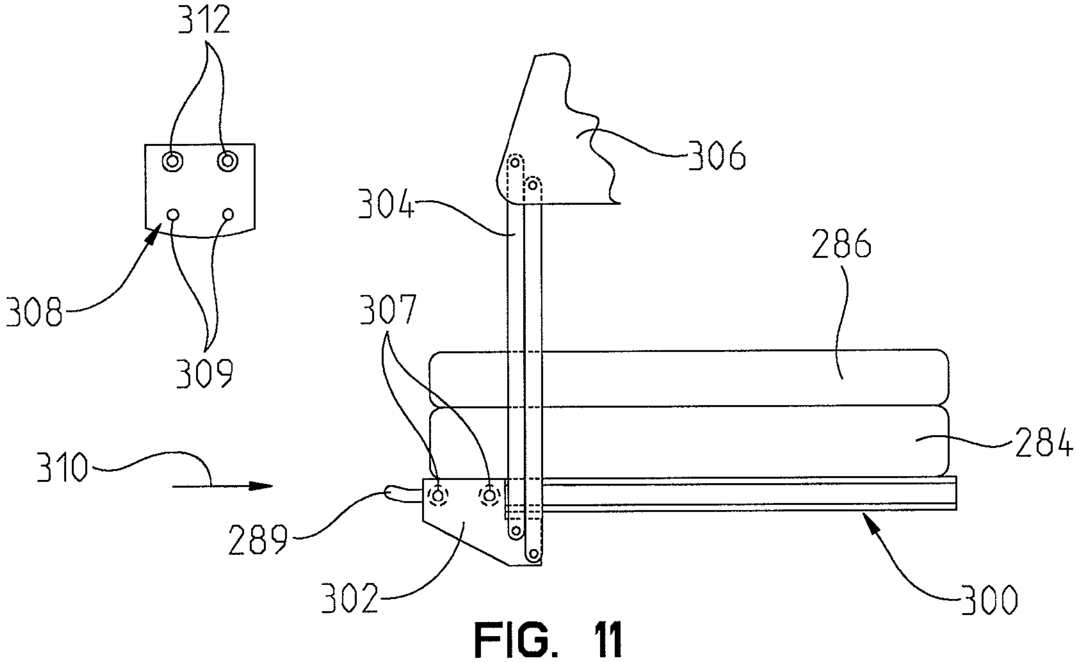

Once the foot section 280 is lowered to its bottommost position, a caregiver can slide the foot section in a direction 310 (see FIG. 8) such that the roller wheels 308 move through the length of the channel bracket 300 to a location where they are prevented from further movement. A stop (not shown) at the end of the channel bracket as illustrated in FIG. 8 prevents the seat section from moving further in the direction 310. The seat section 280 is stowed beneath the mainframe 262 as previously described. FIG. 11, also illustrates this position where the four bar linkage is essentially perpendicular with respect to the floor.

To move the seat section 280 to the upper position for patient use, the caregiver pulls the foot section 280 in a direction opposite the direction 310 until the roller wheels 308 engage a stop at the opposite end of the channel bracket 300, as illustrated in FIG. 7. Once the position is reached, the foot section 280 may be raised either manually by the caregiver to the latched position or may be assisted by the use of gas springs (not shown). Once the top of the detachable portion 282 reaches a plane corresponding to the plane of the seat section 274, the seat section 280 may be moved in the direction 310 to engage the roller wheels 312 as previously described.

Although the invention has been described with reference to the preferred embodiments, variations and modifications exist within the scope and spirit of the invention as described and defined in the following claims. For instance, the linkage coupled to the foot section can be coupled to either the seat section 274 or to the frame 22. Connecting the linkage to the seat section 274, however, provides for the linkage arms to travel a predetermined distance from the seat section in the same path such that the stowed position can be determined.

The invention claimed is:

1. A patient support comprising:

a frame;

a leg support coupled to the frame;

a foot section including a patient support deck and a mattress portion having an upper surface; and a linkage comprising a pair of link arms, each of the link arms pivotably coupled to the foot section such that the link arms pivot relative to the foot section and each of the link arms pivotably coupled to the frame at respective pivot points such that the link arms pivot relative to the frame;

wherein the foot section is movable between a raised position wherein the upper surface of the mattress portion lies in a first plane that overlies the leg support to provide support for a patient and a lowered position wherein substantially all of the foot section is positioned vertically lower than substantially all of the frame and the pivot points at which the link arms are connected to the frame; and wherein a portion of the upper surface of the foot section is maintained in a generally horizontal orientation as the foot section is moved between the raised position and the lowered position.

2. The patient support of claim 1, further comprising a seat section coupled to the frame, wherein the seat section includes an upper surface which is aligned with the upper surface of the foot section when the foot section is in the raised position.

3. The patient support of claim 2, wherein the linkage includes a first end pivotably coupled to the seat section and a second end pivotably coupled to the foot section, wherein the linkage is adapted to support the foot section during movement of the foot section between the raised position and the lowered position, and the linkage is configured to maintain the upper surface of the mattress parallel to the first plane as the foot section moves between the raised and lowered positions.

4. The patient support of claim 3, wherein the second end coupled to the foot section comprises a slide, the slide adapted to move the foot section from the lowered position to a stowed position.

5. The patient support of claim 4, wherein the stowed position comprises a position in which the seat section overlies the foot section.

6. The patient support of claim 1, wherein the mattress portion includes an inner section and an outer section positioned laterally adjacent the inner section, the outer section coupled to the inner section wherein the outer section is adapted to fold with respect to the inner section about an axis that is parallel to the longitudinal length of the patient support.

7. The patient support of claim 1, wherein the mattress portion includes an inner section, a first outer section positioned laterally adjacent the inner section and a second outer section positioned laterally adjacent the inner section on a side of the inner section opposite the side the first outer section is positioned, the first and second outer sections being coupled to the inner section wherein the first and second outer sections are adapted to fold with respect to the inner section about an axis that is parallel to the longitudinal length of the patient support.

8. The patient support of claim 1, wherein the foot section is movable between the lowered position and a stowed position.

9. The patient support of claim 8, wherein the linkage is adapted to provide for movement of the foot section from the lowered position to the stowed position.

10. The patient support of claim 9, wherein the linkage comprises a slide, the slide adapted to move the foot section from the lowered position to a stowed position.

11. The patient support of claim 10, wherein the slide comprises a slide housing and an extension slide, wherein the extension slide is coupled to the slide housing and adapted to move with respect thereto.

12. The patient support of claim 11, wherein the extension slide includes a first position corresponding to the lowered position and a second position corresponding to the stowed position.

13. A patient support to support a patient comprising:

a frame;

a leg support coupled to the frame; and a deck, including a plurality of sections, at least one of the plurality of sections being a foot section pivotably coupled to the frame at a pivot axis and movable between a first position wherein the foot section cooperates with one of the plurality of sections other than the foot section to define a first generally horizontal plane above the frame and a second position spaced vertically below the first generally horizontal plane and substantially below the frame and the pivot axis, wherein the foot section is movable independently from the leg support;

wherein the foot section includes an inner section and an outer section positioned laterally adjacent the inner section, the outer section coupled to the inner section wherein the outer section is adapted to fold with respect to the inner section about an axis that is parallel to the longitudinal length of the patient support.

14. The patient support of claim 13, wherein the foot section is operatively coupled to the frame.

15. The patient support of claim 13, wherein in the second position the inner section defines a second generally horizontal plane lower than the first generally horizontal plane and the foot section.

16. The patient support of claim 13, further comprising a linkage coupled to the foot section and to the one of the plurality of sections other than the foot section, wherein the linkage is adapted to provide for movement of the foot section from the first position to the second position.

17. The patient support of claim 16, wherein the linkage comprises a slide, the slide adapted to locate the foot section in the first position.

18. The patient support of claim 13, wherein the deck includes a seat section and the foot section is movable to a stowed position beneath the seat section.

19. A patient support to support a patient comprising:

a frame;

a leg support coupled to the frame;

a deck, including a plurality of sections, at least one of the plurality of sections being a foot section pivotably coupled to the frame at a pivot axis and movable between a first position wherein the foot section cooperates with one of the plurality of sections other than the foot section to define a first generally horizontal plane above the frame and a second position spaced vertically below the first generally horizontal plane and substantially below the frame and the pivot axis, wherein the foot section is movable independently from the leg support; and a linkage coupled to the foot section and to the one of the plurality of sections other than the foot section, wherein the linkage is adapted to provide for movement of the foot section from the first position to the second position, wherein the linkage comprises a slide, the slide adapted to locate the foot section in the first position.

* * * * *